Sept. 12, 1967  SOICHIRO HORIUCHI ETAL  3,341,645
METHOD OF PRODUCING VISCOSE RAYON STAPLE AND A SPINNING
APPARATUS FOR USE IN THE METHOD
Filed Feb. 26, 1964

INVENTORS
SOICHIRO HORIUCHI
JUNICHI HASHIMOTO
KAZUHIKO YAMADA
KANJI WAKABAYASHI
EIJI MASUNAGA
ISAMU KISHIMOTO
BY
ATTORNEY

Sept. 12, 1967  SOICHIRO HORIUCHI ET AL  3,341,645
METHOD OF PRODUCING VISCOSE RAYON STAPLE AND A SPINNING
APPARATUS FOR USE IN THE METHOD
Filed Feb. 26, 1964                                  5 Sheets-Sheet 3

United States Patent Office 3,341,645
Patented Sept. 12, 1967

3,341,645
METHOD OF PRODUCING VISCOSE RAYON STAPLE AND A SPINNING APPARATUS FOR USE IN THE METHOD
Soichiro Horiuchi, Junichi Hashimoto, Kanji Wakabayashi, Kazuhiko Yamada, Eiji Masunaga, and Isamu Kishimoto, Yamaguchi-ken, Japan, assignors to Teijin Limited, Osaka, Japan, a corporation of Japan
Filed Feb. 26, 1964, Ser. No. 347,453
Claims priority, application Japan, Mar. 7, 1963, 38/10,444; Mar. 29, 1963, 38/14,119, 38/14,120; Apr. 6, 1963, 38/17,312
7 Claims. (Cl. 264—196)

ABSTRACT OF THE DISCLOSURE

Method and apparatus for producing viscose fibers having desirable knot tenacity and high ratio of wet tenacity to conditioned tenacity with high productivity wherein an annular spinneret having a channel and at least 10,000 orifices around it, and a plate having many apertures for regulating and distributing the flow of coagulation liquid which flow is concurrent with the viscose is employed. Additionally coagulated filaments are stretched in air in one step with a draw ratio of 1.5 to 3.5. Peripheral speed of stretching roller is controlled not to exceed 10 m./min. and the drawn filaments are caused to run in air until the degree of regeneration reaches 65 to 85%, and then regenerated completely.

---

This invention relates to an improved method of producing viscose rayon staple from viscose containing cellulose component of relatively high degree of polymerization and of which alkali content is relatively low, and to a spinning apparatus suited for use in the spinning step of the said improved method.

Methods of producing viscose rayon staple from viscose containing cellulose component of relatively high degree of polymerization and of which alkali content is relatively low are known. Products of those known methods are conventionally referred to as "high or intermediate wet modulus fiber," and have properties closer to those of cotton when compared with conventional viscose rayon staple. However, heretofore known high wet modulus fiber still lacks sufficient knot tenacity and conditioned and wet elongations, and is not quite satisfactory as textile fiber. Attempts have been made to improve the property or properties of the fiber by varying the production conditions, but they invariably undesirably affected one or more of preferred properties of the product such as high alkali resistance, high tensile tenacity and suitable ratio of wet tenacity to conditioned tenacity. Also, heretofore known method of production of high wet modulus fiber has low productivity.

If the spinning lineal speed and/or number of orifices of the spinneret are increased in order to raise the productivity, increase in abnormal fiber-formation frequency and degradation in the quality of the product cannot be avoided.

Accordingly, one of the main objects of the invention is to provide an improved process for the production of high wet modulus fiber possessing properties desirable for textile fibers.

Another object of the invention is to provide an improved process for the production of high wet modulus fiber possessing more desirable knot tenacity and conditioned and wet elongations, while retaining, or even bettered, high alkali resistance, tensile tenacity or wet tenacity/conditioned tenacity ratio of the conventional high wet modulus fiber.

Still another object of the invention is to provide a process for the production of high wet modulus fiber with a higher productivity without the heretofore inevitable increase in abnormal fiber-formation frequency and degradation in the quality of the product.

One particular object of the invention is to provide a process for the production of the crimped high wet modulus fiber having the aforesaid improved properties with a high productivity.

Still another object of the invention is to provide a spinning apparatus suitable for use in the spinning step of the process of the invention.

Other objects and advantages of the invention will become clear from the following disclosures.

The process for the production of high wet modulus fiber in accordance with the invention comprises extruding a viscose for high wet modulus fiber through a spinneret having at least 10,000 orifices at a spinning lineal speed not in excess of 10 m./min. into a spinning bath, stretching the resultant gelled filament by means of a pair of godet rollers positioned outside the bath by 150–350%, running the filament which has left the second roller until its degree of regeneration reaches 65–85%, and thereafter subjecting the filament to post-treatments.

The viscose used in the invention contains 4–7 wt. percent of a cellulose of which degre of polymerization is at least 500, and 3–6 wt. percent of sodium hydroxide and has a gamma value of at least 60. Such viscose is well known as the material for high wet modulus fiber. This type of viscose may sometimes be referred to in the specification as viscose of relatively high degree of polymerization and of relatively low alkali content, or viscose for high wet modulus fiber.

The preferred viscose for high wet modulus fiber used in the process of the invention contains 4–6.5 wt. percent of cellulose component having a degree of polymerization ranging 550–750 and 3–4.5 wt. percent of sodium hydroxide, and has a gamma value of 65–75.

The spinning bath used in the process of the invention is composed of coagulation liquid containing not more than 30 g./l. of sulfuric acid, at least 0.1 g./l. of zinc sulfate and not more than 80 g./l. of sodium sulfate, maintained at a temperature not higher than 30° C. The preferred coagulation liquid contains 10–20 g./l. of sulfuric acid and 40–60 g./l. of sodium sulfate, maintained at a temperature ranging from 10–20° C. The concentration of zinc sulfate in the spinning bath should be determined by whether or not crimped staple fiber is desired. If a crimped product is desired, zinc sulfate concentration of 0.5–3.0 g./l., particularly 1.0–2.0 g./l. is preferred, otherwise a concentration ranging 0.2–0.8 g./l. is preferred. Further, the composition of the spinning bath specified in the specification and the claims is that of the fresh coagulation liquid to be supplied to the bath.

Now referring to the attached drawings,
FIG. 1 is a schematic drawing for explaining the process of the invention.
FIG. 2 is a plan view showing one example of a circular spinneret suitably used in the process and apparatus of the invention.
FIG. 3 shows cross-section of the spinneret of FIG. 2, cut along the line 3—3.
FIG. 4 is a plan view of another circular spinneret assembly whch may be suitably used in the process and apparatus of the invention.
FIG. 5 shows cross-section of the assembly of FIG. 4 cut along the line 5—5.
FIG. 6 is a plan view of still another spinneret assembly useful for the process of the invention.
FIG. 7 shows cross-section of the assembly of FIG. 6, cut along the line 6—6.
FIGS. 8 and 9 are given for explaining an embodiment of the spinning apparatus of the invention, which is suited for the practice of the process of the invention.

Figure 1:
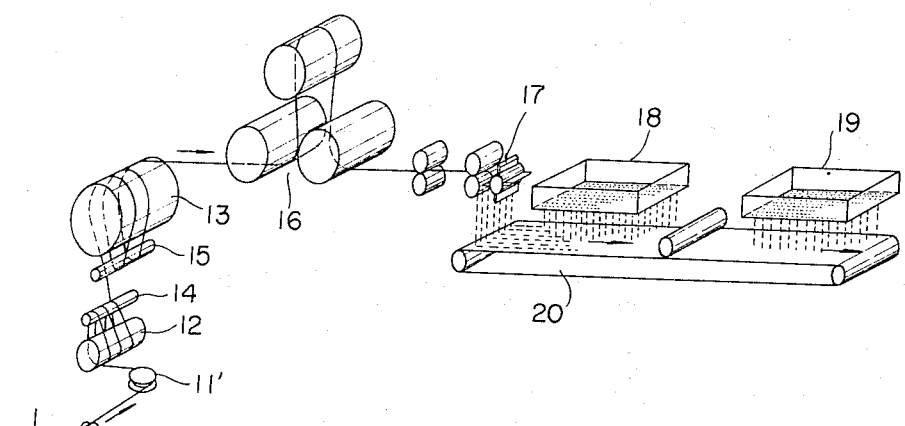

As shown in FIG. 1, the viscose is supplied through the viscose conduit 1, and spun into the spinning bath through the spinneret 3 placed in the spinning chamber 2. The spinneret 3 has at least 10,000 orifices. The at least 10,000 strands of filaments leaving the spinning chamber 2 are guided by the guide rollers 11 and 11', and are stretched between the pair of godet rollers 12 and 13 by 150–350%. The desired stretching is achieved by suitably adjusting the peripheral speeds of the rollers 12 and 13. The rollers 12 and 13 are each provided with hooks 14 and 15, respectively. In the specification and claims the peripheral speed of the second godet roller 13, i.e. the stretching roller, is referred to as the "spinning lineal speed," which should not exceed 10 m./min. The filaments leaving the second roller 13 is passed outside the bath until their degree of regeneration reaches 65–85%. In that case, it is objectionable to exert an excessive tension on the filaments, and therefore it is preferred to make the ratio of the peripheral speed of the second godet roller 13 to that of the collecting roller 16 from 100:97 to 100:110. As the threads shrink by about 3% as the regeneration advances, when the said ratio is about 100:97, substantially no tension or slack is present in the threads and they can be smoothly collected. At the collecting roller 16, several filament groups each consisting of 10,000 strands or more are collected to form threads of larger denier. Thus obtained threads of which degree of regeneration is 65–85% are then subjected to post-treating steps. In most cases, the threads are cut into staple of desired length by the cutter 17, completed of their regeneration by the shower from the hot water shower-trays 18 and 19 on a net conveyor 20, washed with water and dried. The cutting may be performed after completion of the regeneration.

Figure 2:
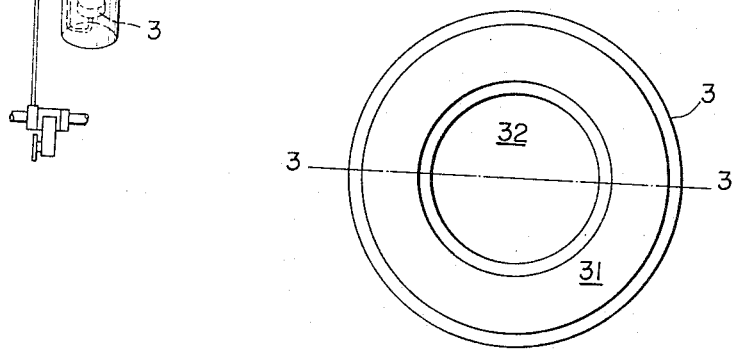
Figure 3:
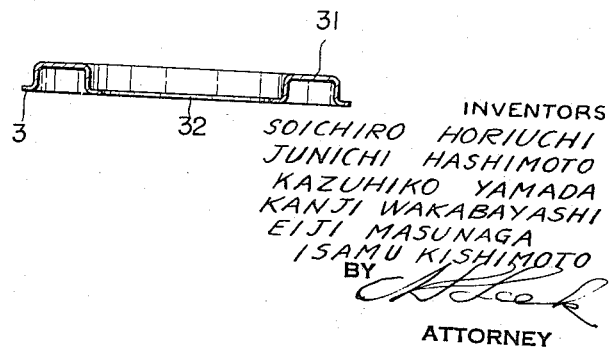

FIGS. 2 and 3 show a preferred embodiment of the spinneret 3 useful in the process and apparatus of the invention. FIG. 2 is a plan view of the spinneret 3 viewed from the direction of the spinneret face on which the orifices (not shown) are provided (perforated surface), and FIG. 3 is a cross-section of the spinneret cut along the line 3—3 shown in FIG. 2. On the circular spinneret face 31, at least 10,000 orifices are provided. The coagulation liquid may be supplied through the central channel 32. The spinneret 3 may be used as set in a suitable spinneret holder (not shown).

Figure 4:
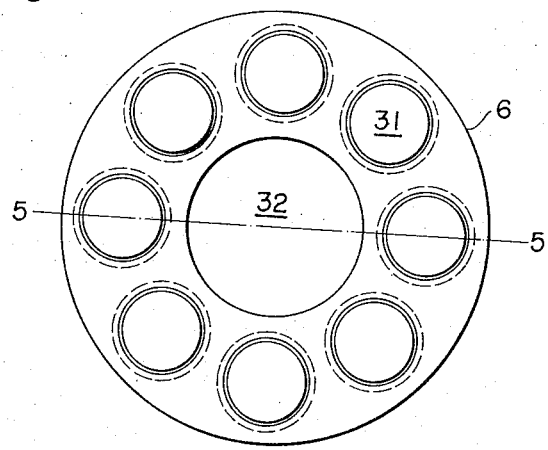
Figure 5:
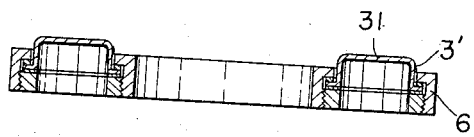

It is also possible in the invention to distribute the 10,000 or more orifices to plurality of unit spinnerets. FIGS. 4 and 5 show a preferred spinneret assembly of a type useful in the process and apparatus of the invention. FIG. 4 is a plan view seen from the direction of the perforated surface on which the orifices (not shown) are provided, and FIG. 5 is a cross-section of the assembly cut along the line 5—5 of FIG. 4. The assembly consists of a plural number of unit spinnerets 3' set in the spinneret holder 6. Each of the unit spinnerets 3 possesses a spinneret face 31 on which the orifices are provided, the total number of the orifices being at least 10,000. The advantage of distributing the orifices to a plural number of unit spinnerets resides in that each unit may be replaced and/or cleaned independently of the other units. The channel 32 provided at the center of the holder 6 is useful as a path for the coagulation liquid.

Figure 6:
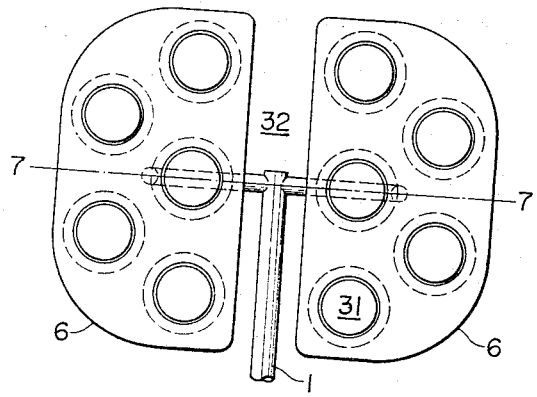
Figure 7:
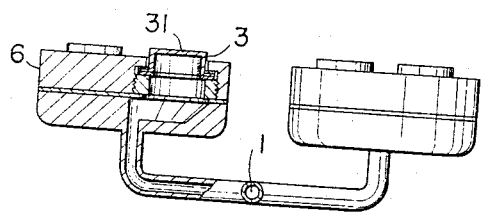

FIGS. 6 and 7 show another type of spinneret assembly useful in the process of the invention. FIG. 6 is the plan view thereof, and FIG. 7 is a partial cross-section of the assembly cut along the line 7—7 of FIG. 6.

For the process and apparatus of the invention, particularly preferred is a spinneret or spinneret assembly provided with a channel 32 at its center, as shown in FIGS. 2 and 3, or FIGS. 4 and 5.

And, the coagulation liquid is let flow in the spinning bath in the direction substantially the same to that of extrusion of the viscose, the flow being so regulated that ¼–¾ of the total amount of flow passes through the said channel 32, and the difference in the sulfuric acid content of the coagulation liquid continuously supplied to the bath from that of the liquid continuously withdrawn from the bath is 0.5–3.0 g./l. It is preferred that in such a bath the filaments are coagulated to such a degree as will enable them to withstand the subsequent 150–350% stretch.

According to the invention, a spinning apparatus useful for the spinning step of the preferred process is provided. The spinning apparatus of the invention for spinning the viscose of relatively high degree of polymerization comprises an open spinning chamber for receiving the coagulation liquid to the predetermined level; a spinneret provided in the spinning chamber at a position lower than the level of the coagulation liquid, said spinneret having at about its center a channel provided substantially perpendicularly to the spinneret face and at least 10,000 orifices around said channel which are bored substantially perpendicularly to the spinneret face, said orifices further being connected with the viscose supplying means; a means for regulating and distributing the flow of the coagulation liquid provided in the spinning chamber at a position lower than the spinneret, said means having many apertures so designed that they regulate the flow of the coagulation liquid and distribute the flow to the channel of the spinneret and around the spinneret at a predetermined ratio; and a means to supply the coagulation liquid provided in the spinning chamber at a position lower than the said regulation and distribution means.

The spinning apparatus in accordance with the invention advantageously possesses an open cylinder provided in the spinning chamber so that the viscose as extruded should run therethrough together with the coagulation liquid, wherein each of the distances between any one point on the contact line of the plane including the spinneret face with the inner wall of the said cylinder and the closest orifice thereto is not more than 10 cm., preferably not exceeding 5 cm. It is not always necessary that the spinneret is completely surrounded by the cylinder. The lower open end of the cylinder may be spaced from the spinneret face, for example, within the limit of half the outer diameter of the spinneret.

Figure 8:
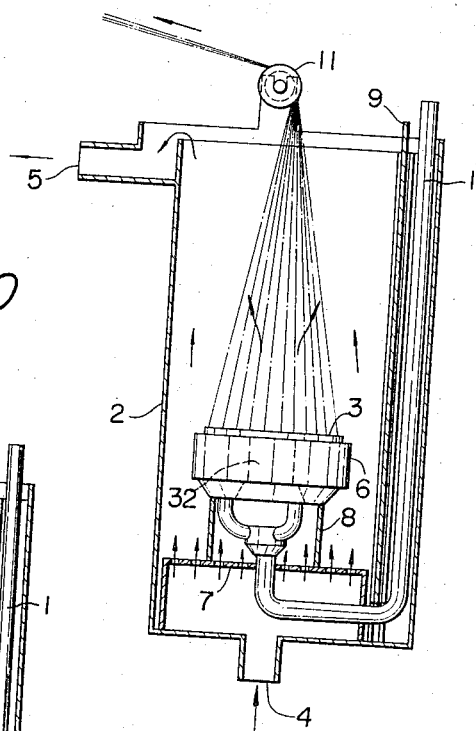
Figure 10:
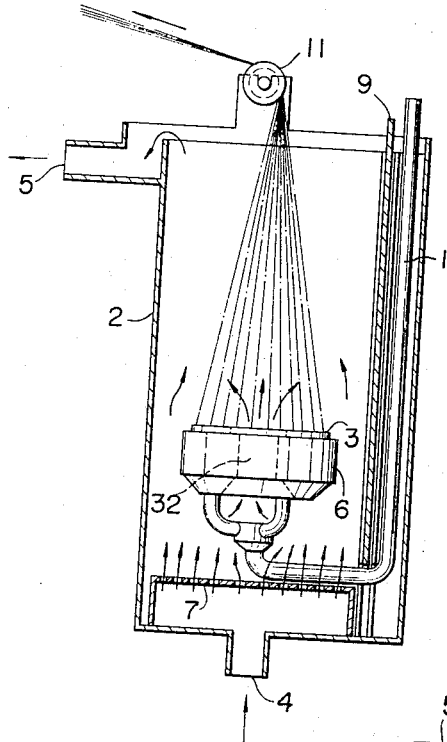
FIGS. 10 and 11 are given for explaining other embodiments of the spinning apparatus of the invention.
Figure 9:
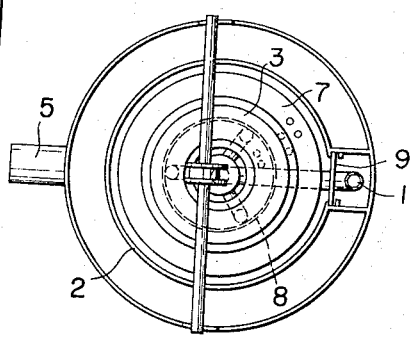
Figure 11:
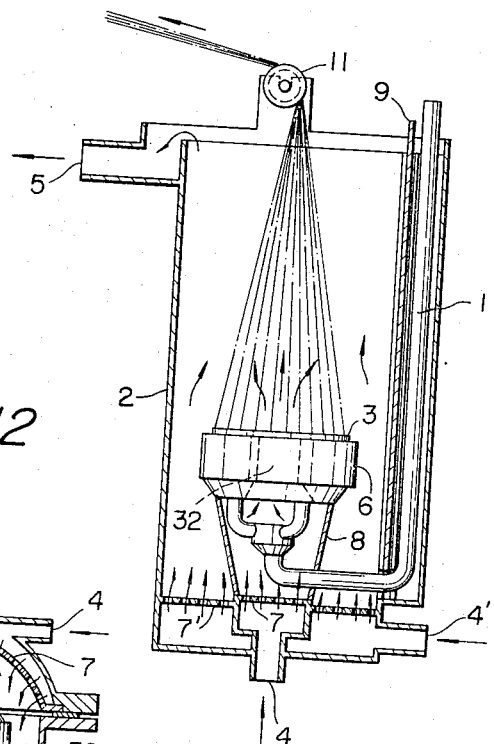

FIGS. 8 and 9 show a preferred spinning apparatus in accordance with the invention. FIG. 8 is a partial vertical cross-section thereof and FIG. 9 is a plan view seen from the above. FIGS. 10 and 11 show modifications of the preferred apparatuses in accordance with the invention.

The cylindrical spinning chamber 2 receives the coagulation liquid. The spinneret 3 is provided, together with the spinneret holder 6 supporting the former, in the spinning chamber at a position lower than the level of the coagulation liquid, with its face at the top. At about the center of the spinneret 3 and the spinneret holder 6, the channel 32 is provided substantially perpendicularly to the spinneret face. The spinneret 3 has at least 10,000 orifices around the channel 32, to which orifices viscose may be supplied through the viscose conduit 1. The coagulation liquid is fed from the coagulation liquid inlet 4 provided at the lower part of the spinning chamber 2, the flow thereof being regulated and distributed so that a portion thereof passes through the channel 32 and the rest, through the space between the spinneret holder 6 and the spinning chamber 2, into the spinning chamber. The overflow of the coagulation liquid is recovered from the coagulation liquid recovery route 5. The regulation and distribution plate 7 is provided with many apertures so that the same can regulate the flow of the coagulation liquid and distribute it to the channel 32 and to around the spinneret at the predetermined ratio. In most cases, the apertures are of 1-5 mm. diameter provided at a pitch of 2-10 mm. The plate may be 2-10 mm. thick. It is preferred, however not critical, to provide a guide means 8 between the spinneret holder 6 and the plate 7 in order to further ensure the regulation and distribution effect of the coagulation liquid flow (cf. FIG. 10). Again as shown in FIG. 11, the coagulation liquid passing through the channel 32 and the space around the spinneret holder 6 may be separately supplied from inlets 4 and 4'. The partition plate 9 is to separate the viscose conduit from the spinning chamber 2, and which forms together with the inner wall of the spinning chamber 2 a spinning cylinder. The distance between any one point on the contact line of the inner wall of the cylinder with the plane including the spinneret face and the orifice closest thereto should not exceed 10 cm., preferably 5 cm.

Figure 12:
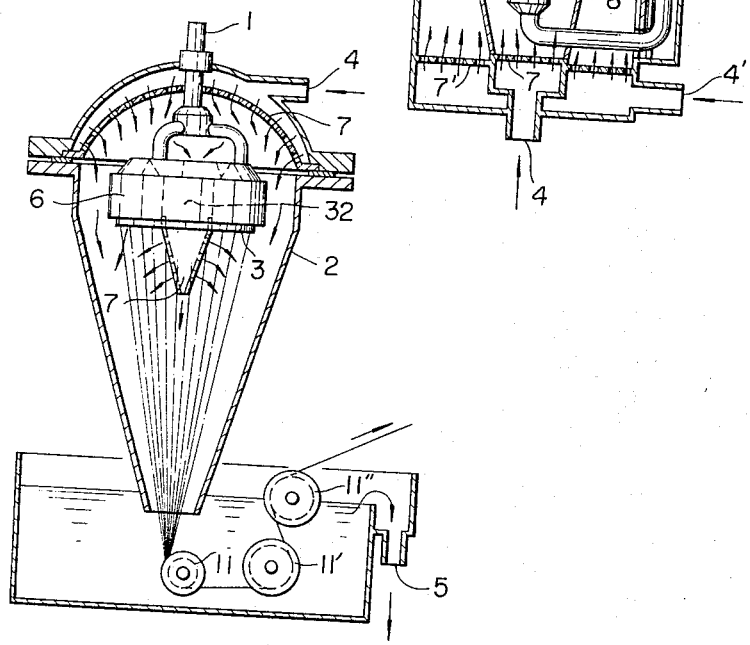
FIG. 12 shows still another embodiment of the spinning apparatus useful for the process of the invention.

FIG. 12 shows another embodiment of the spinning apparatus useful for the process of the invention. In that embodiment, the viscose and coagulation liquid are supplied from the upper part of the apparatus, and also an auxiliary flow regulation and distribution means 7' is provided as shown in the drawing.

The first characteristics of the invention is that the viscose can be spun at a lineal speed not exceeding 10 m./min., using a spinneret or an assembly of unit spinnerets having at least 10,000 orifices, "the spinning lineal speed" herein referred to meaning the peripheral speed of the stretching roller.

Generally for increase in productiviy, two factors, i.e. increase in spinning lineal speed (a) (in m./min.) and that in number of orifices (b), are equally influential. Viewing from the point of productivity only, "a" and "b" may be so selected as to increase the product "ab." However all combinations of "a" and "b" giving the equal productivity by no means are equally desirable from the viewpoint of frequency of abnormal fiber formation. As proven in the later-appearing Example 10, in a series of operations of which $ab \geq 100,000$ (this case may be hereinafter referred to as a productivity index of at least 100), if the lineal speed of spinning "a" exceeds 10 m./min., the frequency of abnormal fiber formation abruptly increases. The abnormal fibers are selected with unaided eye, weighed to the unit of mg., and the amount is expressed in terms of percent by weight. Commercially acceptable amount of the abnormal fibers is at most 0.01%. For the production of fibers in which the amount of abnormal fibers is not more than 0.01% at a productivity index as high as 100 or more, it is critical that the spinning lineal speed should not exceed 10 m./min.

Figure 13:
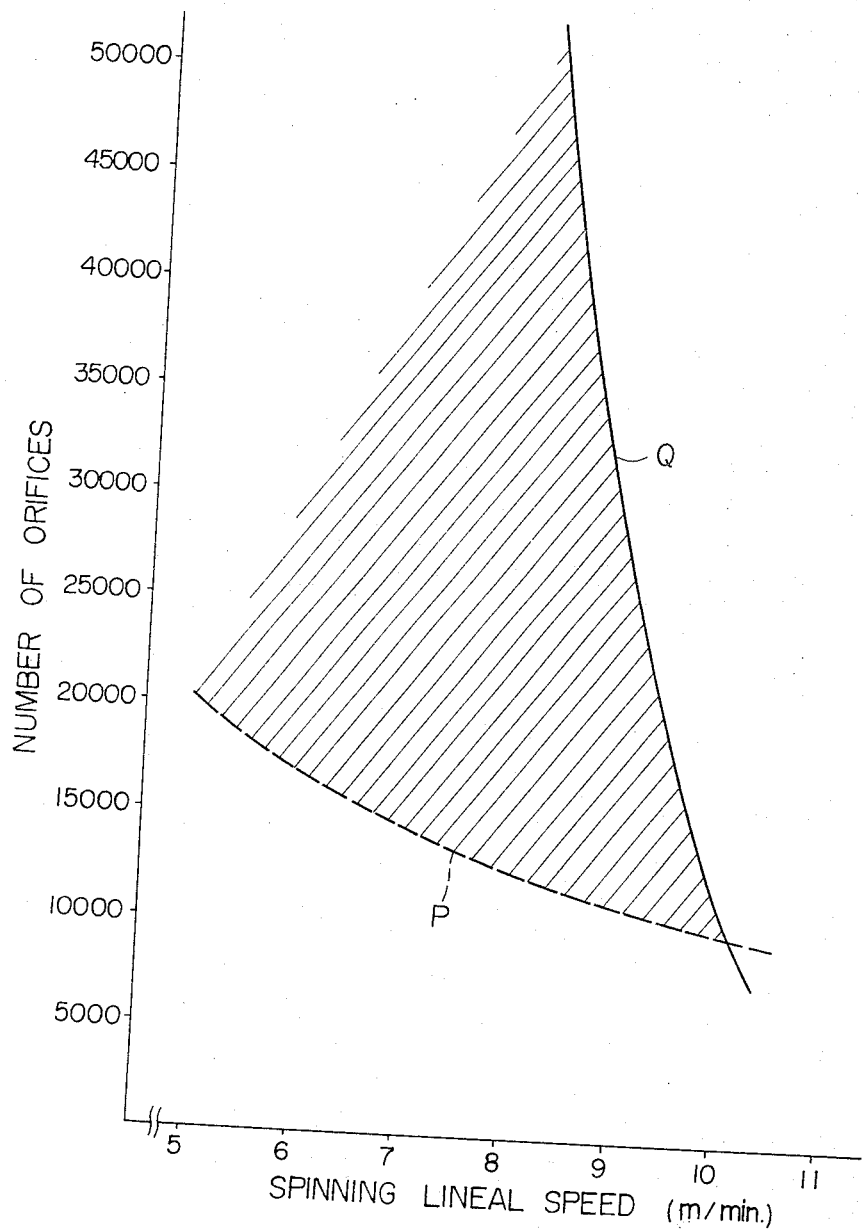
FIG. 13 is a graph showing the relationship between the preferred number of orifices and the preferred lineal speed of spinning.

Therefore, for the manufacture of the product of low abnormal fiber content at a high productivity, it is important to increase the number of orifices at the sacrifice of the spinning lineal speed. In the most preferred embodiment of the invention, it is recommended to select the spinning lineal speed and the number of orifices within the area indicated with diagonal lines in FIG. 13, surrounded by the two curves P and Q.

The second characteristics of the invention is that the gelled filaments taken out from the bath are stretched by 150-350% between the two godet rollers outside the bath. If the stretching is less than 150%, product of sufficient tenacity cannot be obtained. Again as the stretching approaches its upper limit, a tendency of filament breakage is observed. In most cases, stretching of 200-300% is preferred.

In accordance with the one stage stretching outside the bath as in the invention, product of improved properties such as knot tenacity, elongation and wet tenacity/conditioned tenacity ratio compared with the case of exerting tension inside the bath is obtained. For a textile fiber, normally knot tenacity of at least 1.8 g./de. is desirable. Again, another advantage of one stage stretching outside the bath is that the frequency of abnormal fiber formation is low.

The third characteristics of the invention is that the filaments which have left the stretching roller are run until their degree of regeneration reaches 65-85%, and thereafter subjected to post-treating steps.

As the filaments which have left the stretching roller run in the air, their regeneration gradually advances due to the small amount of acid contained therein. If they are subjected to post-treating steps before their degree of regeneration reaches 65%, since their filament formation is still incomplete, mutual adhesion of the filaments takes place and the amount of the abnormal fiber increases. Furthermore, the tenacity of the product also is insufficient. On the other hand, when the degree of regeneration exceeds 85% before the post-treating steps, the product will have insufficient elongation and knot tenacity. When non-crimped product is desired, the degree of regeneration ranging from 75-85% is generally recommended. Particularly, when a spinning bath of relatively high zinc sulfate concentration such as 0.5-3.0 g./l., preferably 1.0-2.0 g./l. is used and the degree of regeneration as aforesaid is made 65-75%, highly crimped staple fiber is obtained.

The degree of regeneration referred to in the specification and claims is determined in the following manner. A sample of 1-2 g. is put in a 300 cc. beaker filled with about 250 cc. of ice cold water containing 50 g./l. of sodium acetate and 250 g./l. of NaCl, immersed and stirred. The sample then is withdrawn, squeezed, and washed for about 10 minutes with about 200 cc. of ice cold NaCl-saturated aqueous solution, which was repeated three times. The sample then is transferred into a beaker containing 10 cc. of N/10 $H_2SO_4$ and 100 cc. of distillation water, boiled for about 10 minutes, and cooled to room temperature. The solution is then back-titrated with N/10 $Na_2Co_3$ using methyl orange as the indicator, and the titration amount ($B_{cc}$) is measured. After the titration, the regenerated cellulose is thoroughly washed with water and dried in a weighing bottle at 100-105° C. for 4 hours. Then the dry weight ($A_g$) of the cellulose is measured with a chemical balance. Separately, the combined alkali (C percent) of the original viscose is determined in accordance with the conventional manner. From the values A, B and C as obtained in the above, the degree of regeneration of the sample is calculated according to the following formula.

$$\text{Regeneration (percent)} = \left[1 - \frac{0.23(10-B)}{A \times C}\right] \times 100$$

As the hot water bath used for the post-treating steps, that of 40° C. to the boiling point of the bath, preferably 70-100° C., containing 0.05-3.0 g./l., preferably 0.1-1.0 g./l., of sulfuric acid and 0.1-4.0 g./l., preferably 0.2-2.0 g./l., of zinc sulfate is suited. From the use of such a bath, the improvement in the product properties can be all the more assured.

According to a specific embodiment of the invention, crimped viscose rayon staple can be obtained. Such a specific process comprises extruding a viscose containing 4-7 wt. percent of cellulose component of which degree of polymerization is at least 500 and 3-6 wt. percent of sodium hydroxide and having a gamma value of at least 60, through a spinneret having at least 10,000 orifices at a spinning lineal speed not exceeding 10 m./min. into a spinning bath containing not more than 30 g./l. of sulfuric acid, 0.5-3.0 g./l of zinc sulfate and not more than 80 g./l. of sodium sulfate, at a temperature not exceeding 30° C., passing the resultant filament through the bath until it becomes capable of resisting a 150-350% stretch, withdrawing the filament from the bath, stretching the filament by 150-350% between a pair of godet rollers outside the bath, running the filament which has left the second godet roller or thread until its degree of regeneration reaches 65–75%, cutting the filament into staple fibers, and then completing its regeneration in an aqueous bath of a temperature between 40°–100° C. containing 0.05–3.0 g./l. of sulfuric acid and 0.1–4.0 g./l. of zinc sulfate, as well as forming crimps therein.

*Example 1*

Viscose of a cellulose concentration 4.8%, an alkali content 3.0%, a gamma value 70 and a degree of polymerization 550 was extruded through a spinneret having 25,000 orifices at a spinning lineal sped of 7.0 m./min. into a coagulating bath of 17° C. containing 12 g./l. of sulfuric acid, 0.4 g./l. of zinc sulfate and 55 g./l. of sodium sulfate, and so formed filament was withdrawn from the bath. The tow of the filament was then stretched between the two rollers set outside the bath by 270%, which was then regenerated in an aqueous bath of about 90° C. to form a product having the properties indicated below. The degree of regeneration of the filament before it entered the aqueous bath was 74%. For comparison, the result of performing the stretching in the bath by two stages of 200% and 135% respective tension with all other conditions exactly the same in as in the above example is also shown.

*Example 2*

Viscose of a cellulose concentration 5.4%, an alkali content 3.6%, a gamma value 65 and a degree of polymerization 500 was extruded through spinnerets of varied orifice numbers at varied lineal speeds into a spinning bath of 18° C. containing 12 g./l. of sulfuric acid, 0.3 g./l. of zinc sulfate and 60 g./l. of sodium sulfate, with the following results. In all cases the degree of regeneration of the filaments before entering the aqueous bath was 80%.

|  | Spinning lineal speed (m./min.) | Number of orifices | Denier | Conditioned tenacity (g./de.) | Wet tenacity (g./de.) | Conditioned elongation (percent) | Wet elongation (percent) | Knot tenacity (g./de.) | Wet tenacity/ Conditioned tenacity | Amount of abnormal fiber (percent) |
|---|---|---|---|---|---|---|---|---|---|---|
| Process of Japanese Patent No. 205,564 | 10 | ¹ 5,000 | 1.2 | 3.6 | 2.7 | 11.0 | 13.0 | 1.5 | 75 | 0.08 |
|  | 10 | ² 10,000 | 1.2 | 4.2 | 3.4 | 11.5 | 12.5 | 1.8 | 80 | 0.009 |
| Process of the invention | 7 | ² 25,000 | 1.2 | 4.6 | 3.8 | 12.3 | 13.7 | 2.4 | 83 | 0.008 |
|  | 5 | ² 35,000 | 1.2 | 5.5 | 4.7 | 13.5 | 14.6 | 2.7 | 85 | 0.009 |

¹ Circular spinneret.  ² Spinneret of the type shown in Fig. 2.

*Example 3*

Viscose of a cellulose concentration 5.3%, an alkali content 3.6%, a gamma value 75, and a degree of polymerization 650 was extruded through a spinneret having 15,000 orifices at a spinning lineal speed of 10 m./min., into a coagulation bath of 20° C. containing 13 g./l. of sulfuric acid, 0.4 g./l. of zinc sulfate and 60 g./l. of sodium sulfate. The tow of thus formed filament was then stretched by 250% at the outside of the bath, passed through the air until its degree of regeneration reached 78%, and completed of the regeneration in an aqueous bath of 60° C. containing 0.5–5.0 g./l. of zinc sulfate and 0.1–1.0 g./l. of sulfuric acid in the absence of tension. The properties of the resultant product are shown below together with controls.

|  | Tension (percent) | | Denier | Conditioned tenacity (g./de.) | Wet tenacity (g./de.) | Conditioned elongation (percent) | Wet elongation (percent) | Knot tenacity (g./de.) | Wet tenacity/ Conditioned tenacity |
|---|---|---|---|---|---|---|---|---|---|
|  | 1st stage | 2d stage | | | | | | | |
| This invention | 270 | ------ | 1.2 | 4.8 | 4.0 | 12.5 | 13.7 | 2.5 | 83 |
| Control | 200 | 135 | 1.2 | 5.0 | 3.5 | 9.5 | 9.8 | 1.2 | 70 |

|  | Sulfuric acid concentration (g./l.) | Zinc sulfate concentration (g./l.) | Denier | Conditioned tenacity (g./de.) | Wet tenacity (g./de.) | Conditioned elongation (percent) | Wet elongation (percent) | Knot tenacity (g./de.) |
|---|---|---|---|---|---|---|---|---|
| Process of the invention | 0.1 | 0.5 | 1.2 | 4.66 | 3.75 | 12.8 | 14.3 | 2.36 |
|  | 1.0 | 0.5 | 1.2 | 4.70 | 3.68 | 12.5 | 13.5 | 2.12 |
| Control | 4.0 | 0.5 | 1.2 | 4.73 | 3.62 | 9.2 | 10.2 | 1.60 |
| Process of the invention | 1.0 | 2 | 1.2 | 4.71 | 3.70 | 12.1 | 13.2 | 2.08 |
| Control | 1.0 | 5 | 1.2 | 4.65 | 3.81 | 9.5 | 10.6 | 1.52 |

Example 4

Viscose similar to that used in Example 3 was spun under the same conditions as in Example 3. The subsequently obtained filaments having a degree of regeneration of 78% were treated in the absence of tension in aqueous baths of 30–80° C. containing 0.5 g./l. of sulfuric acid, 0.3 g./l. of zinc sulfate and completed of its regeneration. Products having the properties as shown below were obtained.

| Bath temperature (° C.) | Denier | Conditioned tenacity (g./de.) | Wet tenacity (g./de.) | Conditioned elongation (percent) | Wet elongation (percent) | Knot tenacity (g./de.) |
|---|---|---|---|---|---|---|
| 30 | 1.2 | 4.63 | 3.47 | 9.5 | 10.7 | 1.59 |
| 40 | 1.2 | 4.68 | 3.72 | 11.5 | 13.0 | 1.90 |
| 50 | 1.2 | 4.74 | 3.76 | 11.8 | 12.5 | 1.92 |
| 80 | 1.2 | 4.65 | 3.70 | 13.2 | 14.4 | 2.36 |

As can be seen from the above, as the temperature of the aqueous bath exceeds 40° C., the quality of the final filaments is conspicuously improved.

Example 5

Viscose similar to that used in Example 3 was similarly spun, and the resultant filaments were stretched by 250% at the outside of the bath, and then passed through air until their degree of regeneration reached 82%. The tows obtained therefrom were treated in an aqueous bath of 70° C. containing 0.2 g./l. of sulfuric acid and 0.8 g./l. of zinc sulfate, each under varied tension of 115%, 110% and 103%, and also in the absence of tension, i.e., 100%. The results were as follows.

| Tension (percent) | Denier | Conditioned tenacity (g./de.) | Wet tenacity (g./de.) | Conditioned elongation (percent) | Wet elongation (percent) | Knot tenacity (g./de.) |
|---|---|---|---|---|---|---|
| 115 | 1.2 | 5.02 | 3.98 | 9.5 | 9.8 | 1.57 |
| 130 | 1.2 | 4.90 | 3.85 | 11.2 | 12.7 | 1.91 |
| 110 | 1.2 | 4.83 | 3.85 | 11.8 | 12.8 | 2.15 |
| 100 | 1.2 | 4.76 | 3.82 | 13.2 | 14.5 | 2.42 |

Example 6

Viscose of a cellulose concentration 6.0%, an alkali content 3.5%, a gamma value of 73 and of a degree of polymerization 500 was spun through a spinneret of the type shown in FIG. 2 having 25,000 orifices at a speed of 9 m./min., into a spinning bath of 14° C. containing 14.5 g./l. of sulfuric acid, 0.5 g./l. of zinc sulfate and 35 g./l. of sodium sulfate. In that, the spinning apparatus as shown in FIG. 9 was used to regulate the amount of flow so that the difference in the sulfuric acid concentration of the coagulation liquid at the inlet and outlet was varied each time as shown below. In said apparatus, one third of the coagulation liquid was passed through the channel 32. The filaments which had left the spinning bath were stretched by 258% at the outside of bath. The filaments were passed through air for 3 minutes, and then completed of their regeneration in an aqueous bath of 90° C. containing 0.8 g./l. of sulfuric acid and 1.0 g./l. of zinc sulfate giving the products having the following properties.

The difference in sulfuric acid concentration of the coagulation liquid at the inlet and outlet of the bath:

|   | g./l. |
|---|---|
| A | 3.6 |
| B | 2.4 |
| C | 1.7 |
| D | 0.4 |

| | Denier | Conditioned tenacity (g./de.) | Wet tenacity (g./de.) | Conditioned elongation (percent) | Wet elongation (percent) | Knot tenacity (g./de.) | Amount of Abnormal fiber (percent) |
|---|---|---|---|---|---|---|---|
| A | 1.2 | 4.2 | 3.5 | 11.0 | 11.9 | 1.6 | 0.08 |
| B | 1.2 | 4.9 | 4.0 | 12.0 | 12.8 | 1.9 | 0.004 |
| C | 1.2 | 5.0 | 3.8 | 12.2 | 13.0 | 1.8 | 0.007 |
| D | 1.2 | 3.8 | 2.7 | 12.5 | 13.7 | 1.5 | 0.3 |

Example 7

Employing the viscose and the conditions of Example 6, at the difference in concentration of the coagulation liquid at the inlet and outlet of the bath of 1.3 g./l., the distribution ratio of the coagulation liquid to the central channel and to around the spinneret was varied as in the table below. The resultant products had the following properties.

| Amount of flow through channel/ total amount of flow | Denier | Conditioned tenacity (g./de.) | Wet tenacity (g./de.) | Conditioned elongation (percent) | Wet elongation (percent) | Knot tenacity (g./de.) | Amount of abnormal fiber (percent) |
|---|---|---|---|---|---|---|---|
| 0 | 1.2 | 4.6 | 3.7 | 11.0 | 12.3 | 1.8 | 0.09 |
| 1/2 | 1.2 | 4.7 | 3.8 | 11.9 | 12.7 | 1.9 | 0.00 |
| 4/5 | 1.2 | 4.5 | 3.8 | 11.6 | 12.7 | 1.7 | 0.23 |

*Example 8*

Viscose of a cellulose concentration 5.4%, an alkali content 3.5%, a gamma value 70 and of a degree of polymerization 600 was prepared which was extruded through a spinneret having 25,000 orifices at a speed of 8.3 m./min., into a spinning bath of 20° C. containing 18 g./l. of sulfuric acid, 0.4 g./l. of zinc sulfate and 50 g./l. of sodium sulfate. The filaments were stretched by 210% at the outside of the bath, and regenerated to the various degrees as indicated below, the regeneration being thereafter completed in an aqueous bath of 70° C. containing 1.0 g./l. of sulfuric acid and 0.5 g./l. of zinc sulfate. As the result, the products of the following properties were obtained.

| Degree of regeneration (percent) | Denier | Conditioned tenacity (g./de.) | Wet tenacity (g./de.) | Conditioned elongation (percent) | Wet elongation (percent) | Knot tenacity (g./de.) | Amount of abnormal fiber (percent) |
|---|---|---|---|---|---|---|---|
| Control 63 | 1.2 | 3.8 | 2.9 | 14.0 | 16.0 | 1.7 | 0.1 |
| This invention 68 | 1.2 | 4.7 | 3.6 | 12.8 | 14.0 | 2.5 | 0.003 |
| This invention 83 | 1.2 | 4.8 | 3.6 | 12.5 | 13.8 | 2.3 | 0.002 |
| Control 88 | 1.2 | 4.2 | 3.1 | 10.0 | 12.0 | 1.5 | 0.07 |

*Example 9*

The same viscose as used in Example 8 was spun using a spinneret having 35,000 orifices at a speed of 6.0 m./min. in a spinning bath of 12° C. containing 10 g./l. of sulfuric acid, 0.3 g./l. of zinc sulfate and 60 g./l. of sodium sulfate, and also in a similar bath of which zinc sulfate content was 1.2 g./l., other conditions being the same. The resultant filaments were stretched by 270% at the outside of the bath, and regenerated each to 70, 72 and 80%. The filaments were then cut into staple fibers, and completed of their regeneration in an aqueous bath of 90° C. containing 1.0 g./l. of sulfuric acid and 1.0 g./l. of zinc sulfate, with simultaneous formation of crimps therein. After the subsequent post-treatments, highly crimped fibers of the following properties were obtained.

| Zinc sulfate content (g./l.) | Degree of regeneration (percent) | Denier | Conditioned tenacity (g./de.) | Wet tenacity (g./de.) | Conditioned elongation (percent) | Wet elongation (percent) | Number of crimps [1] | Degree of crimping [2] (percent) |
|---|---|---|---|---|---|---|---|---|
| 0.3 | 70 | 1.2 | 4.7 | 3.6 | 12.6 | 13.7 | 13 | 12 |
| 1.2 | 72 | 1.2 | 4.6 | 3.5 | 14.2 | 15.6 | 20 | 18 |
| 1.2 | 80 | 1.2 | 4.9 | 3.5 | 13.8 | 14.0 | 9 | 10 |

[1] Number of crimps per the sample of 25 mm. length under a load of 2 mg./de.
[2] Percent=b−a/b×100 wherein $a$ being the length of the sample of 25 mm. length under a load of 2 mg./de. and $b$ being the length of the sample of 25 mm. length under a load of 50 mg./de.

*Example 10*

Viscose of a cellulose concentration of 5.5%, an alkali content of 3.0%, a gamma value of 65 and of a degree of polymerization 550 was extruded into a spinning bath of 18° C. containing 14 g./l. of sulfuric acid, 0.3 g./l. of zinc sulfate and 60 g./l. of sodium sulfate, at the varied lineal speeds of spinning and through spinnerets of varied orifice numbers. Thus formed tows of the filaments were stretched by 200% at the outside of the bath and regenerated to 80%, followed by cutting into staple fibers and completion of the regeneration in an aqueous bath of 90° C. containing 0.5 g./l. of sulfuric acid and 0.5 g./l. of zinc sulfate. After the post-treatments, fibers (1.2 de.) of the following properties were obtained.

| | Lineal speed (m./min.) | Number of orifices | Conditioned tenacity (g./de.) | Wet tenacity (g./de.) | Conditioned elongation (percent) | Wet elongation (percent) | Knot tenacity (g./de.) | Amount of abnormal fiber (percent) | Productivity index |
|---|---|---|---|---|---|---|---|---|---|
| Process of the invention | 9.0 | 30,000 | 4.7 | 3.9 | 12.8 | 13.7 | 2.4 | 0.007 | 270 (ab=270,000) |
| | 8.0 | 40,000 | 5.0 | 4.1 | 13.2 | 14.1 | 2.6 | 0.003 | 320 (ab=320,000) |
| | 8.0 | 50,000 | 4.8 | 3.8 | 13.3 | 13.9 | 2.5 | 0.004 | 400 (ab=400,000) |
| Control | 12.0 | 30,000 | 4.5 | 3.4 | 10 | 11.8 | 1.7 | 0.04 | 330 (ab=330,000) |
| | 11.0 | 40,000 | 4.6 | 3.5 | 11.1 | 12.1 | 1.8 | 0.08 | 400 (ab=400,000) |

We claim:
1. Method of producing viscose fibers comprising extruding a viscose having a gamma value of at least 60 and containing between 4% and 7% by weight of a cellulose component having a degree of polymerization of at least 500 and between 3% and 6% by weight of sodium hydroxide through an annular spinneret provided with a channel at about its center, with at least 10,000 orifices around the channel at a temperature not higher than 30° C. into a coagulation bath containing not more than 30 g./l. of sulphuric acid, at least 0.1 g./l. of anhydrous zinc sulphate and not more than 80 g./l. of anhydrous sodium sulphate, the coagulation liquid being allowed to flow into the bath in substantially the same direction as that of the extrusion of the viscose, stretching the partially regenerated filaments with a draw ratio of 1.5 to 3.5 by means of a pair of rollers outside the bath, and completing the regeneration in a hot aqueous bath characterised in that the viscose is extruded into the coagulation bath at a spinning lineal speed not exceeding 10 m./min., ¼ to ¾ of the total amount of the flow of the coagulation liquid into the bath is passed through said channel in the spinneret, wherein the difference in the sulphuric acid content of the coagulation liquid continuously supplied to the bath and that continuously withdrawn from the bath is adjusted to between 0.5 and 3.0 g./l., and whereby the filament which has left the second roller is run in air prior to the completion of the regeneration until its degree of regeneration reaches between 65 and 85%.

2. Method according to claim 1 wherein the hot aqueous bath is at a temperature ranging from 40°–100° C. and contains between 0.05 and 3.0 g./l. of sulphuric acid and between 0.1 and 4.0 g./l. of anhydrous zinc sulphate.

3. Method according to claim 1 of producing crimped viscose rayon staple wherein the coagulation bath includes between 0.5 and 3.0 grams per litre of zinc sulphate, and the filament which has left the second roller is run until its degree of regeneration reaches between 65 and 75% thereafter is cut into staple fiber and is completely regenerated.

4. An apparatus for use in spinning a viscose containing a cellulose component of relatively high degree of polymerization comprising an annular spinneret provided at about its center with a channel arranged substantially perpendicularly to the spinneret face with at least 10,000 orifices arranged substantially perpendicularly to the spinneret face around the channel, viscose-supplying means communicated to the said orifices, and means to supply a coagulation liquid through the said channel as well as around the spinneret, providing a means for regulating and distributing the flow of the coagulation liquid, the said regulating and distribution means having a large number of apertures so arranged that they regulate the flow of the coagulation liquid and distribute it to the channel in the spinneret and around the spinneret at a predetermined ratio.

5. An apparatus according to claim 4, characterised in that an open cylinder is provided through which the viscose run as it is extruded together with the coagulation liquid, wherein the distance between any point on the contacting line of the plane including the spinneret face and the inner wall of the cylinder and the orifice closest thereto does not exceed 10 cm.

6. An apparatus according to claim 5, characterised in that said open cylinder is a cylindrical spinning chamber in which the said annular spinneret and the said regulating and distributing means are provided.

7. An apparatus according to claim 4, characterised in that there is provided an additional means for guiding and leading the flow of the coagulation liquid distributed by the said regulation and distribution means respectively into the channel in and around the spinneret.

References Cited

UNITED STATES PATENTS

| | | | |
|---|---|---|---|
| 2,536,092 | 1/1951 | Roberts | 264—180 |
| 2,536,094 | 1/1951 | McDermott et al. | 264—180 |
| 2,882,122 | 4/1959 | Emery | 264—168 |
| 2,987,371 | 6/1961 | Henry | 264—197 |
| 2,997,365 | 8/1961 | Smith et al. | 264—197 |
| 3,046,083 | 7/1962 | Bates et al. | 264—168 |
| 3,108,849 | 10/1963 | Owashi et al. | |
| 3,139,467 | 6/1964 | Drisch et al. | |
| 3,277,226 | 10/1966 | Bochno et al. | |
| 3,324,216 | 6/1967 | Inoshita | 264—197 |

ALEXANDER H. BRODMERKEL, *Primary Examiner.*

J. H. WOO, *Assistant Examiner.*